United States Patent [19]

Dominguez-Burguette et al.

[11] 4,404,247

[45] Sep. 13, 1983

[54] PROTECTIVE COVERING FOR MAGNETIC RECORDING MEDIUM

[75] Inventors: Mario Dominguez-Burguette, Woodbury, Minn.; George D. Foss, River Falls, Wis.

[73] Assignee: Minnesota Mining and Manufacturing Company, St. Paul, Minn.

[21] Appl. No.: 394,531

[22] Filed: Jul. 2, 1982

[51] Int. Cl.$^3$ ............... G11B 5/82; B32B 27/30
[52] U.S. Cl. ................... 428/213; 360/134; 360/135; 360/136; 358/335; 427/54.1; 427/131; 427/132; 427/409; 427/410; 428/64; 428/65; 428/216; 428/336; 428/411; 428/413; 428/420; 428/422; 428/694; 428/695; 428/522; 428/900
[58] Field of Search ............. 427/131, 132, 54.1; 428/694, 695, 900, 421, 422, 64, 65, 420, 336, 213, 216, 411, 522, 413; 422/410, 409; 360/134–136; 369/286, 283; 358/128.5

[56] References Cited

U.S. PATENT DOCUMENTS

| | | | |
|---|---|---|---|
| 2,644,787 | 7/1953 | Bonn et al. | 204/43 |
| 3,138,479 | 6/1964 | Foley | 117/47 |
| 3,350,180 | 10/1967 | Croll | 29/183.5 |
| 3,531,322 | 9/1970 | Billerica et al. | 117/236 |
| 3,778,308 | 12/1973 | Roller | 428/900 |
| 3,810,874 | 5/1974 | Mitsch et al. | 260/75 H |
| 3,973,072 | 8/1976 | Anderson et al. | 428/336 |
| 4,188,434 | 2/1980 | Loran | 427/131 |
| 4,210,946 | 7/1980 | Iwasaki et al. | 260/131 |
| 4,267,238 | 5/1981 | Chernega | 428/422 |
| 4,268,556 | 5/1981 | Pedrotty | 428/65 |
| 4,321,404 | 3/1982 | Williams et al. | 560/115 |
| 4,327,139 | 4/1982 | Schaefer et al. | 428/65 |

FOREIGN PATENT DOCUMENTS

| | | | |
|---|---|---|---|
| 51-307 | 1/1976 | Japan | 427/131 |
| 52-16202 | 2/1977 | Japan | 427/131 |
| 53-20204 | 6/1978 | Japan | 427/131 |
| 54-123922 | 9/1979 | Japan | 427/131 |

OTHER PUBLICATIONS

*Primary Examiner*—Ellis P. Robinson
*Attorney, Agent, or Firm*—Donald M. Sell; Cruzan Alexander; William G. Ewert

[57] ABSTRACT

Magnetic recording medium protected by an ultra-thin, composite low surface energy covering provided by an inner layer of insoluble polymer and an outer layer of insoluble polymer which are made by in situ polymerization. The inner layer is made from two monomers such as a hydantoin hexacrylate and alpha-methyl styrene. The outer layer is made from polymerizable perfluoropolyether monomer having ethylenicaly unsaturated polymerizable groups. The composite low surface energy covering is especially useful for providing lubricity and corrosion resistance to a metallic thin-film magnetic recording coating.

21 Claims, No Drawings

PROTECTIVE COVERING FOR MAGNETIC RECORDING MEDIUM

TECHNICAL FIELD

The invention concerns a magnetic recording medium, the magnetizable coating of which is protected by an adherent covering which acts as a lubricant and can also act as a barrier against air if the magnetizable coating is subject to oxidation. The invention especially concerns protective coverings for metallic thin-film magnetic recording media.

BACKGROUND ART

While the magnetizable coatings of virtually all magnetic recording media now in use comprise magnetizable particles dispersed in organic binder, the amount of information that can be recorded on any such medium is reaching the theoretical limit. It is known that information can be recorded more compactly on metallic thin-film magnetic recording media, but such media are highly susceptible to abrasion when moved across a magnetic recording head. Hence, such media require some sort of protective covering which should also protect the metallic thin-film coating against corrosion upon exposure to air.

U.S. Pat. Nos. 2,644,787 (Bonn et al.), 3,138,479 (Foley), 3,350,180 (Croll), and 4,210,946 (Iwasaki et al.) disclose various types of metallic thin-film magnetic recording media. U.S. Pat. No. 3,973,072 (Anderson) discloses a nonmetallic thin-film magnetic recording medium for which a protective covering would also be especially useful. Unlike particulate magnetizable coatings, thin-film coatings do not have pores into which conventional lubricants may be adsorbed and hence they are more easily moved by or transferred to recording heads.

U.S. Pat. No. 3,531,322 (Kefalos et al.) discloses a protective covering for metallic, thin-film magnetic recording media which it calls a "pseudo-film". This "pseudo-film" is similar in metallurgical properties to the magnetic layer, e.g., a nonmagnetic Ni-alloy is provided as a protective covering over a magnetic Ni-alloy. A level of hardness approximating that of the magnetic layer is described as providing a two- or threefold increase in useful life, as defined by a drop in readout signal of no more than a few percent. The "pseudo-film" is also said to offer an improvement in corrosion resistance. However, hard protective coverings cause an undesirable degree of wear of the recording head. If of sufficient thickness to be effective, they may produce an undesirably large spacing between the recording head and the magnetic coating. Also, if applied as disclosed in the patent, the hard protective coverings may not have sufficiently uniform thicknesses to insure recording uniformity over the entire magnetic coating.

Lubricants such as are commonly used on particulate magnetizable coatings have also been used in efforts to prevent damage to metallic thin-film magnetic coatings. Among a wide variety of lubricants developed for particulate magnetic recording media are fluorinated polyethers disclosed in U.S. Pat. Nos. 4,268,556 (Pedrotty) and 4,337,139 (Schaefer et al.). The paragraph bridging columns 6 and 7 of the former discloses that such lubricants were applied to the nonmetallic thin-film magnetic recording coating of U.S. Pat. No. 3,973,072 (Anderson). However, it is believed that no material which has been suggested as a magnetic recording lubricant would adequately protect metallic thin-film magnetic recording coatings against abrasion, much less effectively protect against corrosion from exposure to air.

While thin-film magnetic recording media involve special problems as discussed above, there is a continuing need for improving the durability of particulate-type magnetic recording coatings, especially for stop-action use in video recorders.

DISCLOSURE OF INVENTION

The present invention comprise a composite, low surface energy, adherent covering which protects metallic thin-film magnetic recording media from abrasion and corrosion far more effectively than do coverings which have been disclosed in the prior art. The novel coverings also proide improved lubrication of particulate-type magnetic coatings.

Briefly, the invention in one aspect comprises a magnetic recording medium having a magnetizable coating, the face or working surface of which is protected by a covering comprising an inner layer of an insoluble polymer made from 80 to 95 parts by weight of a film-forming aromatic or heterocyclic polymerizable monomer having a plurality of ethylenically unsaturated polymerizable groups and correspondingly 20 to 5 parts by weight of vinyl aromatic comonomer, and an outer layer of an insoluble polymer made from monomer having a perfluoropolyether segment which comprises a plurality of perfluoroalkylene oxide, $—C_aF_{2a}O—$, repeating units, where subscript a of each such unit is independently an integer from 1 to 4, which segment preferably has a number average molecular weight of 500 to 20,000, said latter monomer also having a plurality of ethylenically unsaturated, polymerizable groups and being copolymerizable with the monomers of said first layer.

Said monomers of said two layers are in-situ polymerized, apparently the contiguous monomers of the two layers copolymerizing, thus bonding the perfluoropolyether segments to the magnetizable coating through the inner layer, which segments thus provide the face of the recording medium with a protective covering of low surface energy. The thickness of the composite inner and outer layers does not exceed 200 nm (nanometers).

By polymerizing the monomers of both layers while they are in their contiguous relationship, the perfluoropolyether segments of the polymeric coating have significantly greater adherence to the magnetizable coating than they would have had the perfluoropolyether monomer been applied directly to the magnetizable coating and then polymerized in situ. By virtue of that greater adhesion, the perfluoropolyether segments tend to remain in place and to resist being moved about by or transferred to recording heads, the composite covering being thus durable.

The composite, low surface energy covering of the invention is very thin, and can approach monomolecularity, thereby minimizing head spacing losses. While being exceedingly difficult to measure, preferred thicknesses of the composite low surface energy coverings of the invention are in the approximate range of 5 to 200 nm, more preferably within 10 to 100 nm. Even at thicknesses of the order of 10 nm, the novel low surface energy covering provides adequate lubricity for sufficiently long periods of time. Increased thicknesses up to 200 nm may provide somewhat longer life where the recording medium is in rugged service, e.g. repeated stop-action at the same frame of a video tape. At thicknesses much greater than 200 nm, spacing losses would become undesirably large.

The composite low surface energy covering of the invention may be applied over the face of a magnetizable coating by the steps of (a) coating onto the magnetizable coating a first dilute solution of said mixture of monomers of said inner layer in a solvent, e.g. methyl ethyl ketone, to provide an inner coating of monomers, (b) coating over the coating of step (a) a second dilute solution of said perfluoropolyether monomer in a fluorinated solvent, e.g. "Freon" 113, to provide an outer coating of such monomer, (c) drying the coatings (to remove the solvents) and subjecting the dried coatings to polymerization conditions to polymerize said monomers (which preferably are addition polymerizable), thus bonding the perfluoropolyether to the magnetizable coating through the inner layer.

Ultraviolet radiation can be used to effect polymerization of the monomers of the two coatings, preferably in an inert atmosphere without the use of a photoinitiator. Although the rate of polymerization is enhanced by photoinitiators or sensitizers such as benzophenone and benzoin, adequate rates can be attained without their use; and they preferably are not used because their presence in the low surface energy covering tends to weaken it. Ultraviolet radiation is especially effective and economical for polymerizing the monomers to provide composite low surface energy coverings up to about 100 nm in thickness.

By covering the magnetizable coating with the composite covering in the manner described above, no significant dimensional changes in the recording medium occur, which will be particularly important where such recording medium is very thin, as in the case of a metallic thin-film recording tape.

The polymers of the inner and outer layers are insoluble, that is, crosslinked, the polymer of the inner layer being insoluble in common organic solvents, e.g. methyl ethyl ketone, and the polymer of the outer layer being insoluble in 1,1,2-trichloro-2,2,1-trifluoroethane ("Freon" 113).

The thickness of the composite covering is conveniently controlled by the proportion of solvent in the two dilute solutions. Coating techniques for in-line processing include brushing, wire or knife coating, spraying, curtain coating and gravure coating. Curtain coating permits essentially simultaneous application of both solutions. If the coating technique used for applying the second solution of perfluoropolyether monomer involves mechanical contact of the underlying or inner coating, e.g., gravure coating, the inner coating should first be dried, and the solvent of the second solution should not be a solvent for the material deposited from the first solution.

Polyfunctional, ethylenically-unsaturated, film-forming aromatic or heterocyclic monomers useful for making the inner layer include polyester acrylates of aromatic dicarboxylic acid such as

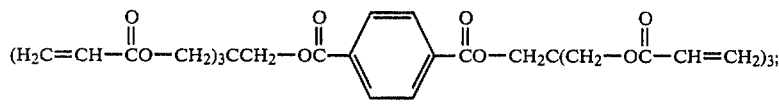

acrylate esters of heterocyclic polyols such as

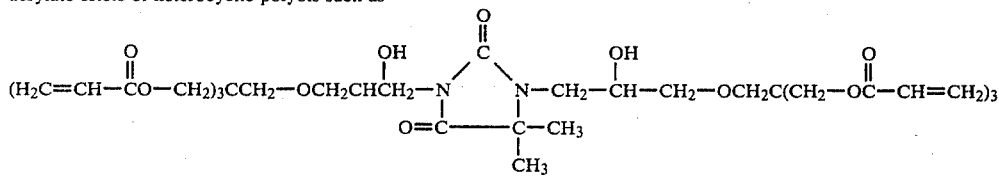

for brevity termed "hydantoin hexaacrylate"; polyacrylate esters of polyhydric phenols such as dimethacrylate of hydroxypropylated bisphenol A and alkoxylated hydroxypropylbisphenol A dimethacrylate.

Vinyl aromatic monomers useful for making the inner layer include styrene, alpha-methylstyrene, alpha-chlorostyrene, alpha-bromostyrene, 2,4-dimethylstyrene, 2,4-dichlorostyrene. These have the function of ensuring that the first layer uniformly covers the entire face of the magnetizable coating. In the absence of a vinyl monomer, there might be minute voids in the composite low-energy layer through which atmospheric air could pass to corrode a metallic thin-film coating. Particularly preferred are styrenes, especially alpha-metylstyrene.

If either more than 20 parts or less than 5 parts of the vinyl monomer were used in making the inner layer, the composite low-energy covering would have less endurance upon repeated passes across recording heads. Best results are obtained with approximately equi-molar amounts, e.g., a 16 to 84 weight ratio when using the preferred alpha-methyl styrene and hydantoin hexaacrylate.

Preferably the polyfunctional ethylenically-unsaturated monomer used for the inner layer is employed in amounts ranging from 1 to 40 parts per part by weight of the perfluoropolyether monomer. If that ratio were less than about 1 to 1, the cohesiveness and the adhesion to the underlying substrate and hence the endurance would be noticeably reduced. Use of a weight ratio greater than about 40 to 1 would be inefficient of the raw material for the inner layer.

Perfluoropolyether monomers preferred for making the outer layer of the composite low surface energy covering of the invention have the formula

wherein Q comprises a polymerizable group attached to a chain of randomly distributed perfluoroalkylene oxide, $-C_aF_{2a}O-$, repeating units, in each of which a is independently an integer of 1 to 4, k is the number of such repeating units and it has a value from 1 to 300 such that the segment preferably has a number average molecular weight of 500 to 20,000, and Z is —OC$_a$F$_{2a+1}$ or Q. If Z is not Q, it preferably is —OCF$_3$, —OCF$_2$CF$_3$, or —OCF(CF$_3$)CF$_3$. Typically the perfluoroalkylene oxide units will be —CF$_2$O—, —C$_2$F$_4$O—, and/or —C$_3$F$_6$O—.

It is preferred that the perfluoropolyether monomers have functionalities within the range of 1.5 to 2.0 in order to provide covalent bonding at both ends of most of the segments.

Preferred perfluoropolyether monomers are the ethylenically-unsaturated monomers disclosed in U.S. Pat. No. 3,810,874 (Mitsch et al.) and U.S. Pat. No. 4,321,404 (Williams et al.) wherein Q of the above Formula A is selected from

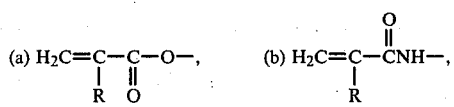

-continued

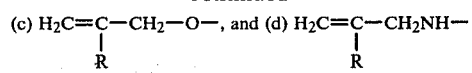

where R is hydrogen or methyl.

These preferred ethylenically-unsaturated perfluoropolyether monomers which have the formula $$Q-CF_2O(CF_2CF_2O)_m(CF_2O)_nCF_2-Q \qquad (B)$$

wherein Q is as defined above and m and n designate the number of randomly distributed perfluoroethyleneoxy and perfluoromethylene oxy backbone repeating units, respectively, n and m having independently values, for example, from 1 to 200, and the ratio m/n is 0.2/1 to 5/1.

Examples of polymerizable perfluoropolyether monomers of Formula A useful for making the low surface energy covering of the invention are those of the following formulas where here again, as elsewhere, the perfluoroalkylene oxide units are randomly distributed, the given number (a subscript) of which are average values.

Perfluoropolyether Monomer

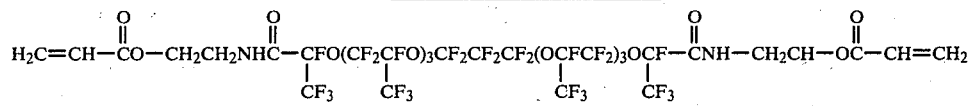  I

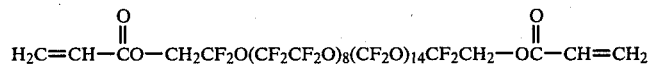  II

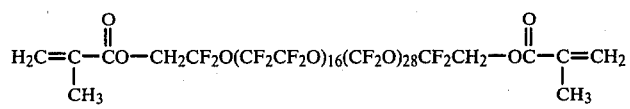  III

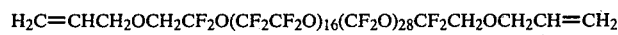  IV

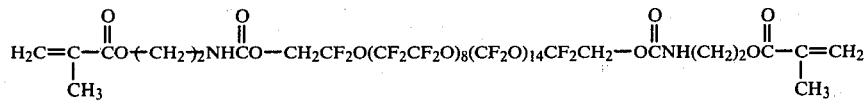  V

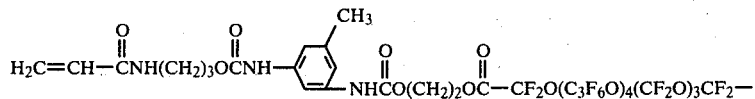  VI

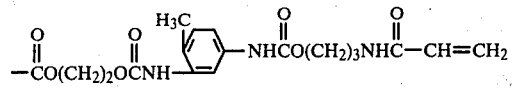

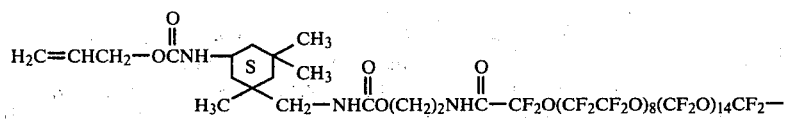  VII

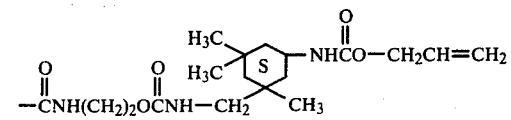

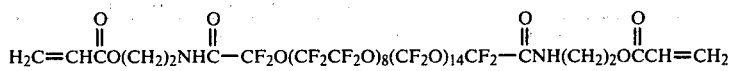  VIII

-continued
Perfluoropolyether Monomer

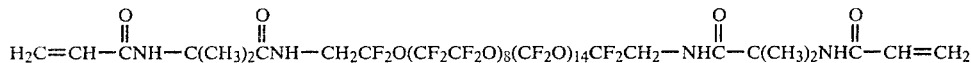

IX

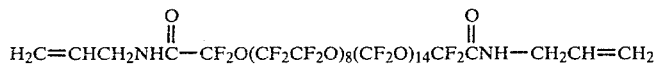

X

In addition to the perfluoropolyether monomer, the solution used to apply the outer coating may contain one or more copolymerizable monomers of other types in amounts up to about 20% by weight of the outer layer. However, the composite low surface energy covering is most effective if at least 75% of the weight of the outer layer is provided by perfluoropolyether segments. Useful copolymerizable monomers of this purpose include acrylic and methacrylic esters, amides, and urethanes, and vinyl ethers, esters, and heterocycles.

EXAMPLES

The invention is illustrated in the following examples. In these examples, a "Corrosion Test" and a "Scratch Resistance Test" were used to evaluate samples.

In the "Corrosion Test", pieces of magnetic recording media 5 cm in length are placed in a chamber at 90% RH and 60° C. for 48 hours and are then examined under a microscope for evidence of corrosion. If the low surface energy covering of a metallic thin-film magnetic recording medium is not fully effective, corrosion will be present and appear as tiny color discontinuities. In the absence of any protective coating, a metallic thin-film magnetic recording medium would experience a general color change indicative of overall corrosion.

In the "Scratch Resistance Test", a test piece of a magnetic recording medium is mounted on a microscope slide and contacted by a 1.5-mm-diameter sapphire bead under a load of 85 g while being oscillated at a frequency of 100 cycles/minute and a stroke length of 4 cm. Time to failure is indicated when a scratch first becomes visible to the naked eye.

Each of the examples employed the same magnetic recording medium 1.3 cm in width which had a biaxially-oriented poly(ethyleneterephthalate) film backing having a thickness of about 0.02 mm and an aluminum thin-film coating on one face. Over that coating was vapor-deposited a cobalt-nickel-titanium alloy to a thickness of about 100 nm to provide a magnetizable coating. In each example, the materials used to make the low surface energy covering were applied by dip coating as described by C. C. Yang et al., *Thin Solid Films*, Volume 74, pages 117–127 (1980). In each example, the second solution contained 0.1 g of Perfluoropolyether II per 100 ml of solvent.

For purposes of comparison, samples of covered magnetic recording media were prepared using first solutions with and without the vinyl aromatic monomer (viz.alpha methyl styrene) required by this invention.

In the examples, all parts are given by weight.

EXAMPLES 1 and 1A

|  | Example | |
|---|---|---|
| First solution: | 1 | 1A |
| dimethacrylate of hydroxypropoxylated bisphenol A | 0.44 g | 0.50 g |
| alpha-methylstyrene | 0.06 g | 0 |
| methylisobutyl ketone | 100 ml | 100 ml |

The magnetic recording medium was dip-coated in the first solution and, after being allowed to dry for a few seconds, was dip-coated in the second solution. After a few more seconds for drying, these coatings were subjected to ultraviolet radiation in a vacuum using a BTC Ascor Vacuum Printer 1601-11 (Berkey Technical, Burbank, California) using a 2 kw Addalux medium-pressure mercury lamp No. 1406-02. This polymerized the coatings to provide a composite low surface energy covering of about 30 nm thickness.

EXAMPLES 2 and 2A

|  | Example | |
|---|---|---|
| First solution | 2 | 2A |
| dimethacrylate of hydroxypropoxylated isophthalic acid | 0.45 g | 0.50 g |
| alpha-methylstyrene | 0.05 g | 0 |
| methylisobutyl ketone | 100 ml | 100 ml |

EXAMPLES 3 and 3A

|  | Example | |
|---|---|---|
| First solution: | 3 | 3A |
| hydantoin hexacrylate | 0.44 g | 0.50 g |
| alpha-methylstyrene | 0.06 g | 0 |
| methylisobutyl ketone | 100 ml | 100 ml |

EXAMPLES 4 and 4A

|  | Example | |
|---|---|---|
| First solution: | 4 | 4A |
| dimethacrylate of ethoxylated bisphenol A | 0.475 g | 0.50 g |
| alpha-methylstyrene | 0.025 g | 0 |
| methylisobutyl ketone | 100 ml | 100 ml |

The resultant magnetic recording media of the foregoing examples were subjected to the "Corrosion Test" and the "Scratch Resistance Test" with the following results. Each "Scratch Resistance" value is an average of six tests.

| Example | Results of Scratch Resistance Test (Time in seconds to failure) | Results of Corrosion Test (Presence of corrosion) |
|---|---|---|
| 1 | 320 | None |
| 1A | 112 | Some |
| 2 | 393 | None |

-continued

| Example | Results of Scratch Resistance Test (Time in seconds to failure) | Results of Corrosion Test (Presence of corrosion) |
|---------|---|---|
| 2A | 148 | Some |
| 3 | 86 | None |
| 3A | 3 | Some |
| 4 | 273 | None |
| 4A | 232 | Some |

Each of the eight media of the foregoing examples has a coefficient of friction of 0.2 or less as measured by the Inclined Plane Standard Method ANSI PHI.47-1972 of American National Standards Institute.

COMPARATIVE EXAMPLES

Instead of being provided with a composite low surface energy covering as in the foregoing examples, a piece of the metallic thin-film magnetic recording medium was dip-coated with a lithium oleate lubricant in the same manner as in the foregoing examples lithium oleate being a well-known lubricant for particulate magnetic recording media. This conventionally lubricated recording medium had "Scratch Resistance" of 75 seconds, and showed corrosion over all its surface in the "Corrosion Tests". Its coefficient of friction was 0.29 to 0.32.

To another piece of the same metallic thin-film magnetic recording medium was applied by dip-coating a solution of the hydroxy-terminated perfluoropolyether polymer of Example 1 of U.S. Pat. No. 4,267,238. This covered recorded medium had a "Scratch Resistance" of about one second.

We claim:
1. A magnetic recording medium having a magnetizable coating, the face of which is covered by a covering comprising
    an inner layer of an insoluble polymer made from 80 to 95 parts by weight of a film-forming aromatic or heterocyclic polymerizable monomer having a plurality of polymerizable, ethylenically unsaturated groups and correspondingly 20 to 5 parts by weight of vinyl aromatic comonomer, and
    an outer layer of insoluble polymer made from monomer having a perfluoropolyether segment which comprises a plurality of —$C_aF_{2a}O$— repeating units, were subscript a is independently in each such units an integer from 1 to 4,
the thickness of said covering not exceeding 200 nm.
2. A magnetic recording medium as defined in claim 1 wherein the weight of the inner layer is from 1 to 40 times that of the outer layer.
3. A magnetic recording medium as defined in claim 1 wherein said perfluoropolyether segment comprises

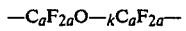
—$C_aF_{2a}O$—$_kC_aF_{2a}$— that is a chain of randomly distributed —$C_aF_{2a}O$— repeating units, in each of which subscript a is independently an integer of 1 to 4, and k is such that the segment has a number average molecular weight of 500 to 20,000.
4. A magnetic recording medium as defined in claim 3 wherein said perfluoropolyether segment is

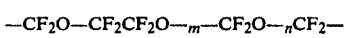
—$CF_2O$—$CF_2CF_2O$—$_m$—$CF_2O$—$_nCF_2$— wherein m and n denote randomly distributed repeating units and the ratio m/n is 0.2/1 to 5/1.
5. A magnetic recording medium as defined in claim 1 wherein the number average molecular weight of said segment is 800 to 10,000.
6. A magnetic recording medium as defined in claim 1 wherein said vinyl aromatic monomer is a styrene.
7. A magnetic recording medium as defined in claim 6 wherein said styrene is alpha-methyl styrene.
8. A magnetic recording medium as defined in claim 1 wherein the perfluoropolyether segments comprise at least 75% by weight of the outer layer.
9. a magnetic recording medium as defined in claim 1 wherein said magnetizable coating is a metallic thin-film coating.
10. A magnetic recording medium as defined in claim 1 wherein said magnetizable coating comprises magnetizable particles in an organic binder.
11. A magnetic recording medium as defined in claim 1 wherein said covering has a thickness of 10 to 100 nm.
12. A magnetic recording medium having a metallic thin-film coating covered with an adherent, cohesive, protective covering having low surface energy, said covering comprising
    an inner layer of an insoluble polymer made of 80 to 95 parts by weight 1,3-bis 3-[2,2,2-(tri- acryloyloxymethyl)ethoxy]-2-hydroxypropyl -5,5-dimethyl-2,4-imidazolidinedione or the dimethacrylate of hydroxypropoxylated bisphenol A and 20 to 5 partsby weight alpha-methyl styrene, and
    an outer layer of an insoluble polymer made from monomer having a perfluoropolyether segment which is

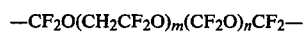
—$CF_2O(CH_2CF_2O)_m(CF_2O)_nCF_2$— wherein m and n denote randmonly distributed repeating units, the ration m/n is in the range of 0.2/1 to 5/1, the number average molecular weight of said segment is in the range of 800 to 10,000, and at least 75 weight percent of said outer layer is said segments,
the weight of said inner layer being from 1 to 40 times that of said outer layer, and the thickness of said covering being in the range of 10 to 100 nm.
13. Method of making a magnetic recording medium with a covering protecting the face of the magnetizable coating of said medium, comprising the steps of
    (a) coating onto said face a first dilute solution of from 80 to 95 parts of a film-forming aromatic or heterocyclic polymerizable monomer having a plurality of polymerizable ethylenically unsaturated groups, and correspondingly from 20 to 5 parts by weight of vinyl aromatic monomer to provide an inner coating,
    (b) coating over the inner coating a second dilute solution of polymerizable monomer having a perfluoropolyether segment comprising a plurality of —$C_aF_{2a}O$— repeating units, where subscript a in each such unit independently is an integer from 1 to 4, to provide an outer coating,
    (c) drying said coatings and polymerizing said monomers, the thickness of the resultant composite covering not exceeding 200 nm.
14. Method as defined in claim 13 wherein coating step (a) is followed by drying to provide a dry inner coating before coating step (b).

15. Method as defined in claims 13 or 14 wherein step (c) involves exposing the two coatings to ultraviolet radiation.

16. Method as defined in claim 15 wherein the irradiation is carried out in an inert atmosphere.

17. Method as defined in claim 13 wherein from 1 to 40 parts of said monomer of said first solution are coated out in step (a) per one part by weight of said monomer coated out in step (b).

18. Method as defined in claim 10 wherein there are 1.5 to 2 polymerizable ethylenically unsaturated groups per perfluoropolyether segment.

19. Method as defined in claim 10 wherein said vinyl aromatic monomer is a styrene.

20. Method as defined in claim 10 wherein said styrene is alpha-methyl styrene.

21. Method as defined in claim 13 wherein perfluoropolyether monomer has the formula $$Q-(C_aF_{2a}O)_k C_aF_{2a}-z$$

wherein Q comprises a polymerizable ethylenically-unsaturated group attached to a chain of k randomly distributed $-C_aF_{2a}O-$ units, in each of which a is independently an integer of 1 to 4, and k is a number from 1 to 300 and z is selected from Q, $-OCF_3$, $-OCF_2CF_3$ and $-OCF(CF_3)CF_3$.

* * * * *

UNITED STATES PATENT AND TRADEMARK OFFICE
CERTIFICATE OF CORRECTION

PATENT NO. : 4,404,247
DATED : September 13, 1983
INVENTOR(S) : Mario Dominguez-Burguette and George D. Foss It is certified that error appears in the above-identified patent and that said Letters Patent is hereby corrected as shown below:

Col. 1, line 64, "4,337,139" should read -- 4,327,139 -- .

Col. 2, line 18, "proide" should read -- provide -- .

Col. 4, line 63, "$Q-C_aF_{2a}O-_kC_aF_{2a}-Z$" should read
-- $Q(C_aF_{2a}O)_kC_aF_{2a}-Z$ -- .

Col. 9, line 27, "Tests"." should read -- Test". -- .

Col. 9, line 57, "$-C_aF_{2a}O-_kC_aF_{2a}-$" should read
-- $(C_aF_{2a}O)_kC_aF_{2a}-$ -- .

Col. 9, line 67, "$-CF_2O-CF_2CF_2O-_m-CF_2O-_nCF_2-$" should read
-- $-CF_2O(CF_2CF_2O)_m(CF_2O)_nCF_2-$ -- .

Col. 10, line 13, "a" should read -- A -- .

Signed and Sealed this

Third Day of July 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,404,247

DATED : September 13, 1983

INVENTOR(S) : Mario Dominguez-Burguette and George D. Foss

It is certified that error appears in the above-identified patent and that said Letters Patent is hereby corrected as shown below:

Col. 11, line 14, "claim 10" should read -- claim 13 -- .
Col. 12, line 1, "claim 10" should read -- claim 13 -- .
Col. 12, line 3, "claim 10" should read -- claim 19 -- .

Signed and Sealed this

Twelfth Day of August 1986

[SEAL]

Attest:

DONALD J. QUIGG

Attesting Officer

Commissioner of Patents and Trademarks